US012790861B2

(12) United States Patent
Grewe

(10) Patent No.: US 12,790,861 B2
(45) Date of Patent: Nov. 10, 2026

(54) PUSH BAR LATCH RELEASE ASSEMBLY

(71) Applicant: Kason Industries, Inc., Newnan, GA (US)

(72) Inventor: Brian Grewe, Winston, GA (US)

(73) Assignee: Kason Industries, Inc., Newnan, GA (US)

( * ) Notice: Subject to any disclaimer, the term of this patent is extended or adjusted under 35 U.S.C. 154(b) by 42 days.

(21) Appl. No.: 19/055,210

(22) Filed: Feb. 17, 2025

(65) Prior Publication Data

US 2026/0243118 A1 Aug. 20, 2026

(51) Int. Cl.

| | |
|---|---|
| ***E05C 3/16*** | (2006.01) |
| ***E05B 1/00*** | (2006.01) |
| ***E05B 65/10*** | (2006.01) |
| ***E05C 3/00*** | (2006.01) |

(52) U.S. Cl.

CPC ................ *E05C 3/16* (2013.01); *E05B 1/003* (2013.01); *E05B 65/1066* (2013.01); *E05C 3/008* (2013.01)

(58) Field of Classification Search

CPC .. Y10T 292/0908; Y10S 292/65; E05B 65/10; E05B 65/1046; E05B 65/106; E05B 65/1066

See application file for complete search history.

(56) References Cited

U.S. PATENT DOCUMENTS

| | | | | |
|---|---|---|---|---|
| 9,140,032 | B2 * | 9/2015 | Lin | E05B 17/0066 |
| 12,442,223 | B1 * | 10/2025 | Hood | E05B 65/1073 |
| 2010/0066102 | A1 * | 3/2010 | Shen | E05B 65/1006 292/92 |
| 2021/0164267 | A1 * | 6/2021 | Holtgrewe | E05B 63/143 |

* cited by examiner

*Primary Examiner* — Christine M Mills
*Assistant Examiner* — Yahya Sidky
(74) *Attorney, Agent, or Firm* — Baker, Donelson, Bearman, Caldwell & Berkowitz, PC

(57) ABSTRACT

A push bar latch release assembly has a first bar mount, a second bar mount, and an elongated push bar. The first bar mount a pivotal actuator cam coupled to the end of a shaft of an exterior handle and has a camming surface. The latch release includes a pivotal L-shaped actuator with a cam following portion and a pushing portion. The cam following portion has a cam follower bearing surface that contacts the camming surface. The latch release also includes a L-shaped catch having a tongue portion and a push plate portion. The catch pivots between a latching position and an unlatching position. The pushing portion of the actuator is configured to push against the push plate portion of the L-shaped catch so as to pivotally move the L-shaped catch from its latching position to its unlatching position.

14 Claims, 9 Drawing Sheets

PUSH BAR LATCH RELEASE ASSEMBLY

TECHNICAL FIELD

This invention relates generally to door latches, and more particularly to the push bar latch release used for commercial refrigerator and freezer doors.

BACKGROUND OF INVENTION

Walk-in cold rooms, such as walk-in coolers, freezers, or other refrigerated environments, are common in various industries, including supermarkets and grocery stores, commercial kitchens, and other food service facilities. These doors typically have one or more access doors for entry and exit from the environment.

A problem associated with a cold-room door is the possibility that a person may become enclosed within the cold-room. To resolve this potential problem the door is provided with an inside release designed to release the latch on the opposite side of the door. The inside release may be in the form of a knob having a threaded rod which mounts the latch to the cold room door. A problem with this type of device is that a person in a panicked state within the cold room may not realize that turning the internal knob releases the latch and allows egress from the cold-room.

Another problem with these types of releases is that some people may not have the hand strength or dexterity to turn a tightened knob type release.

Some bar type latches have been designed which allow a person to simply push upon an elongated horizontal bar to operate a latch. These types of bar latches operate by directly actuating the release mechanism of the latch, i.e., the bar is directly coupled to the strike which prevents the opening of the door. This type of bar latch is shown in U.S. Pat. Nos. 5,947,534; 5,547,235; 3,897,092, and 2,320,298. These types of bar latches directly operate the strike through linkage which may become inoperable over time due to wear.

Another problem associated with these rooms is that refrigerator door is intended to be locked to prevent the theft of goods contained within the refrigerator. As such, the outside latch is oftentimes provided with a locking mechanism to prevent the opening of the door to prevent theft.

Accordingly, there is a need in the art for a latch release that is easier for people to recognize and operate. It is to the provision of such therefore that the present invention is primarily directed.

SUMMARY OF THE INVENTION

In a preferred form of the invention a push bar latch release assembly is couplable to a door for engagement with a door strike on a door frame associated with the door. The push bar latch release assembly comprises an exterior handle latch having a pivotal handle and a pivotal shaft coupled to the pivotal handle and an interior latch release coupled to the exterior handle latch. The interior latch release comprises a first bar mount, a second bar mount, and an elongated push bar coupled to the first bar mount and the second bar mount for movement between a push bar latched position and a push bar unlatched position. The first bar mount comprises a support bracket mounted to the door, a reciprocally pivotable actuator cam coupled to the shaft of the exterior handle, the actuator cam having a camming surface, the actuator cam being pivotal between a cam latched position and a cam unlatched position, a reciprocally pivotable actuator having a cam following portion in camming contact with the camming surface of the actuator cam, and a pushing portion oriented at an angle to the cam following portion, the actuator being pivotal between an actuator latched position when the actuator cam is in its cam latched position and an actuator unlatched position when the actuator cam is in its cam unlatched position. The interior latch release also includes a L-shaped catch having a push plate portion in contacting engagement with the pushing portion of the actuator, and a tongue portion oriented at an angle to the push plate portion engageable with the door strike of the door frame, the L-shaped catch being pivotal between a catch latched position engaging the door strike when the actuator is in its actuator latched position and a catch unlatched position unengaged with the door strike when the actuator is in its actuator unlatched position, the L-shaped catch also being pivotal between the catch latched position engaging the door strike when the push bar is in its push bar latched position and the catch unlatched position unengaged with the door strike when the push bar is in its push bar unlatched position. The interior latch release also includes a cover coupled to the support bracket and covering the actuator cam, the actuator, and the L-shaped catch.

Figure 1:
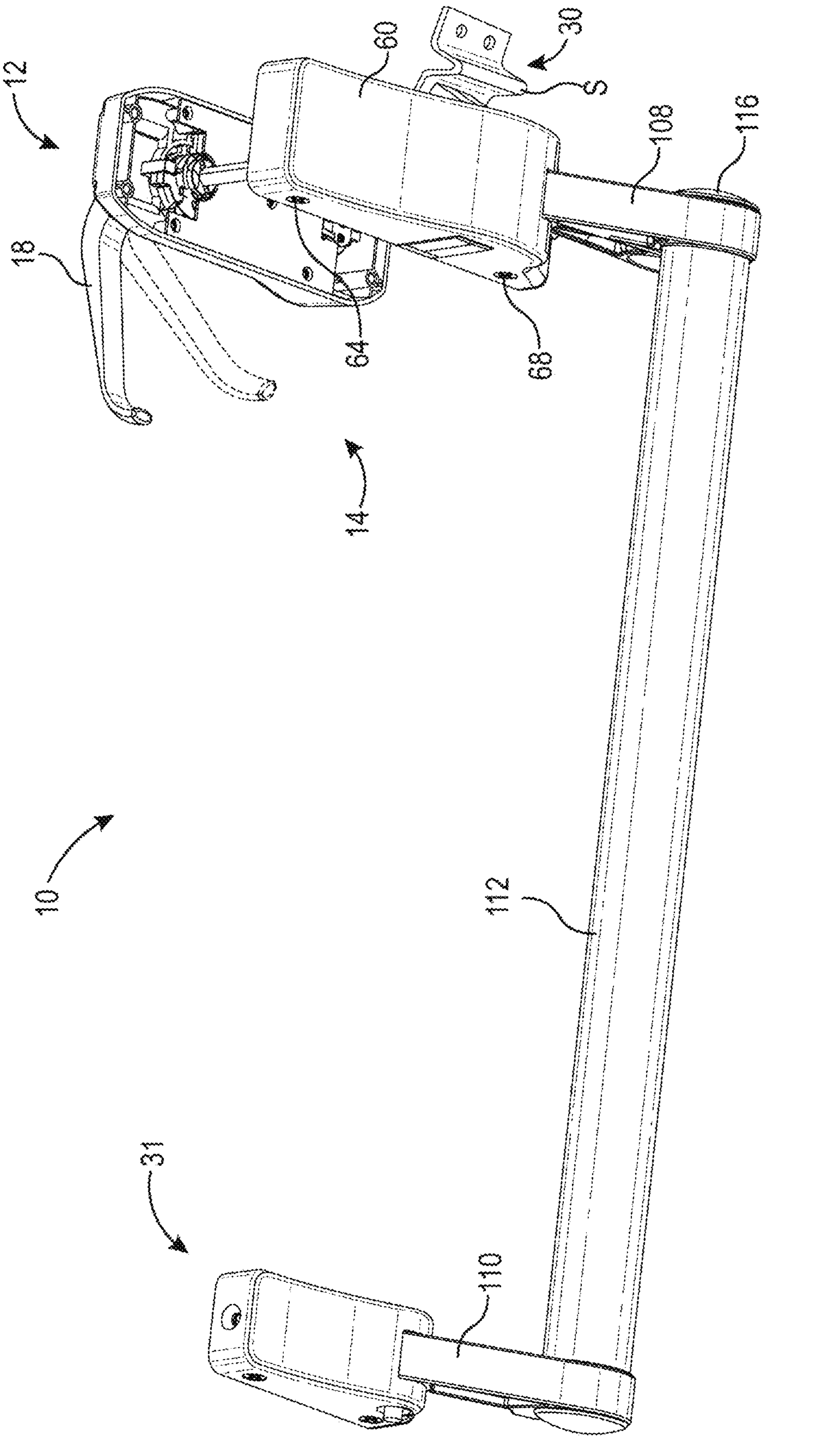
FIG. 1 is a front, perspective view of a push bar latch release assembly embodying principles of the invention in a preferred form.

FIG. is 6 a side view of a portion of the push bar latch release assembly of FIG. 1, shown in a latched position.

Figure 7:
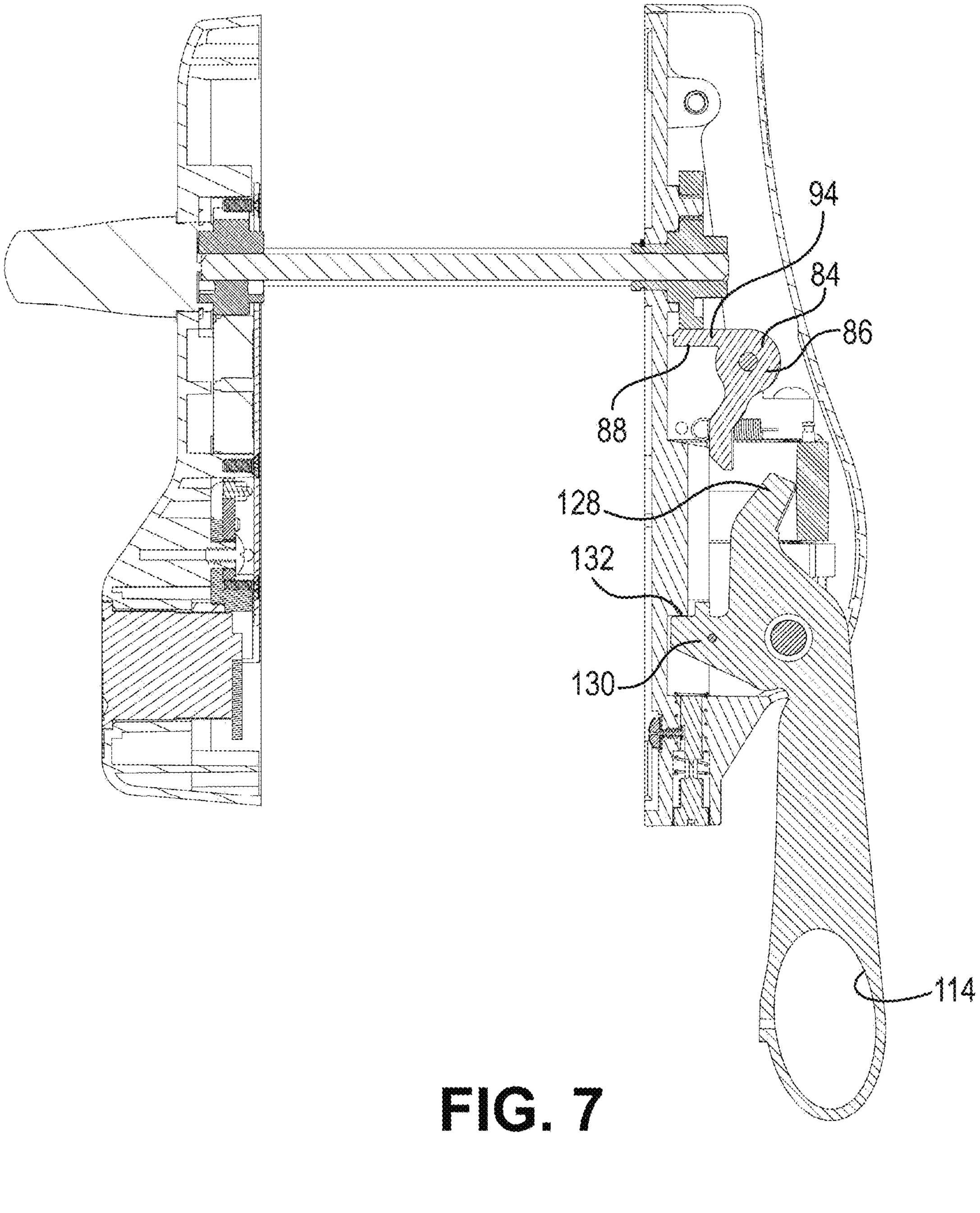

FIG. 7 is a side view of a portion of the push bar latch release assembly of FIG. 1, shown in an unlatched position.

Figure 8:
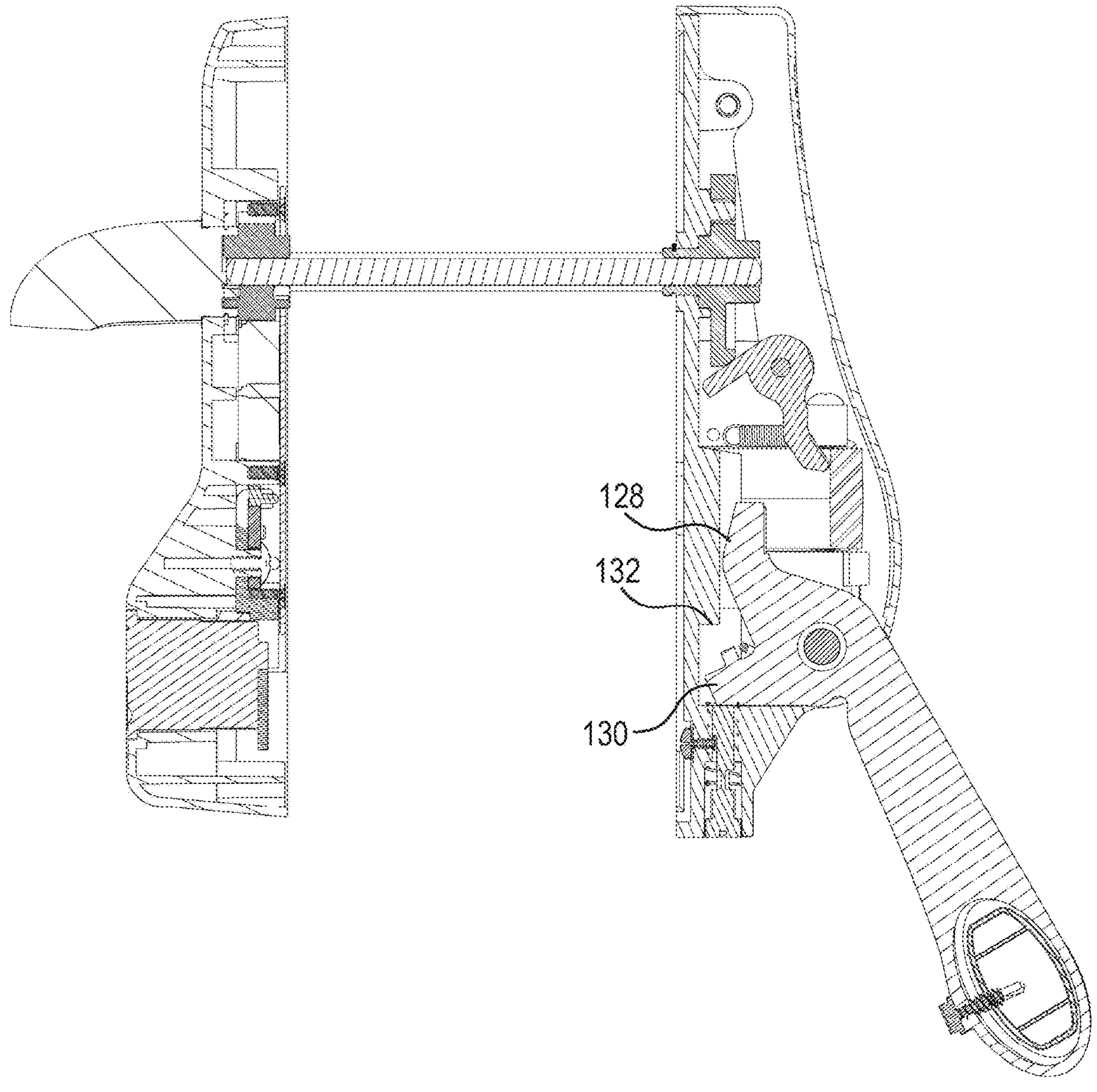

FIG. 8 is a side view of a portion of the push bar latch release assembly of FIG. 1, shown in an unlatched position.

Figure 9:
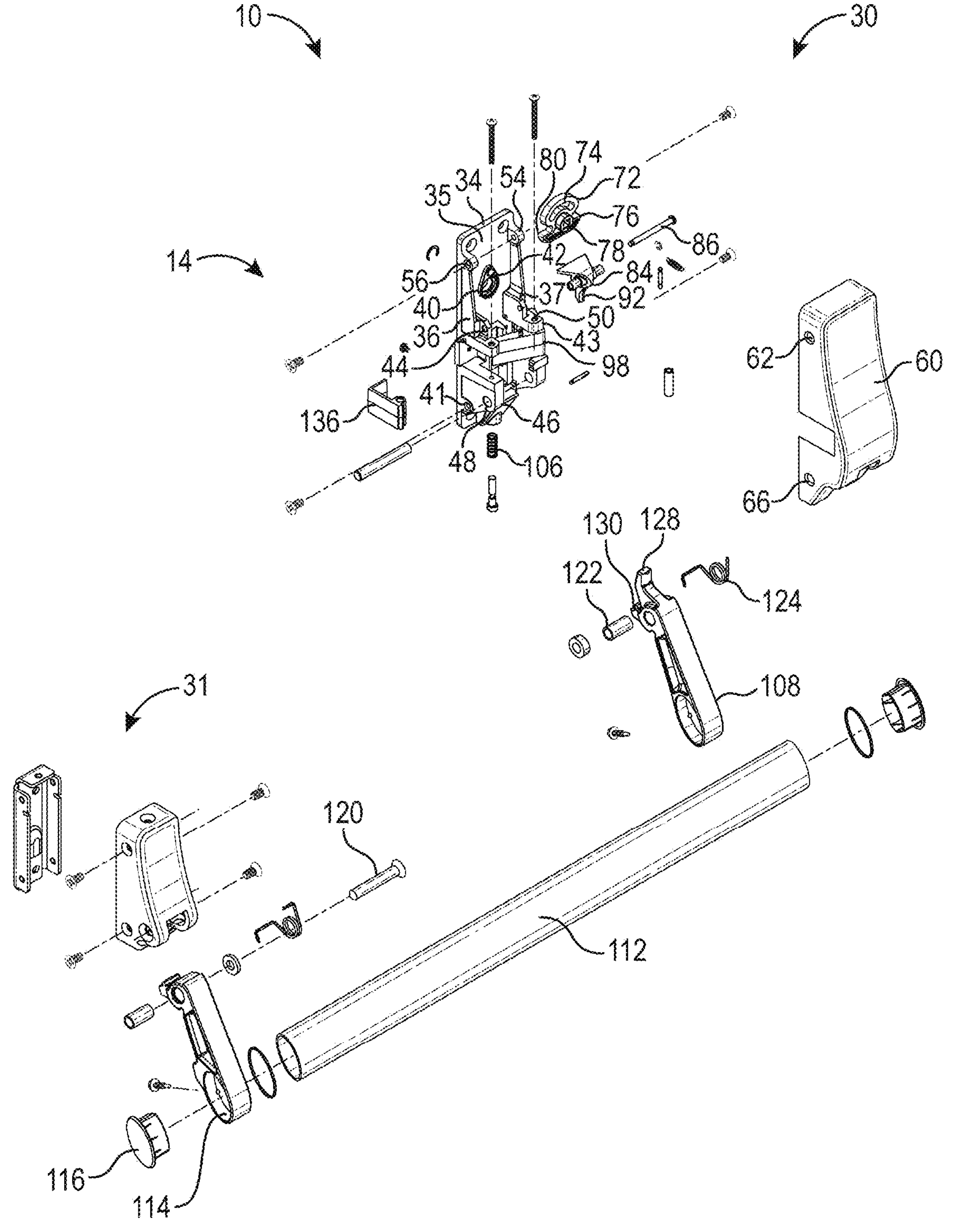

FIG. 9 is an exploded, perspective view of a portion of the push bar latch release assembly of FIG. 1.

DETAILED DESCRIPTION

With reference next to the drawings, there is shown a push bar latch release assembly 10 according to the present invention. The push bar latch release assembly 10 includes an exterior handle latch or exterior latch 12 and a push bar type interior latch release 14 coupled to the exterior latch 12. The latch release 14 is mounted to the interior or inside surface of a door D of a walk-in cold room within a surrounding wall to control and/or restrict opening of the door D and access the walk-in cold room. The exterior latch 12 is mounted to the exterior surface of the door D. The exterior latch 12 has a pivotal handle 18 that is coupled to a square-shaped spindle or shaft 16 that pivots with the pivotal movement of the handle 18.

The latch release 14 includes a first bar mount 30, a second bar mount 31, and an elongated push bar 32 coupled to and extending between the first bar mount 30 and the second bar mount 31. The first and second bar mounts 30 and 31 are mounted to the interior surface of the door D.

The first bar mount 30 has a support bracket 34 with a floor 35, a first, left side wall or side bolster 36 and a second, right side wall or side bolster 37 extending from the floor 35. The floor 35 has a circular hole or opening 40 through which extends the handle shaft 16. A cam guide pin 42 extends from the floor 35 adjacent the opening 40.

The left side wall 36 and right side wall 37 each have internally threaded lower screw mounting holes 41. The left side wall 36 and right side wall 37 also each have an actuator or top lugs or bolsters 43 having an actuator or top pivot pin mounting hole 44 therethrough and handle mount or bottom lugs or bolsters 46 each having a handle mount or bottom pivot pin mounting hole 48 therethrough. The left side wall 36 and right side wall 37 also each have a pair of vertically oriented tongue pivot pin mounting holes 50.

The first bar mount 30 also has two oppositely disposed upper lugs or ears 54 having internally threaded upper screw mounting holes 56 therethrough. The floor 35 has unshown, conventional screw mounting holes extending through the floor 35 through which mounting screws extend to mount the support bracket 34 to the door D.

The first bar mount 30 also has a cover 60 with two top screw mounting holes 62 alignable with the upper screw mounting holes 56 so that two top mounting screws 64 may pass through top screw mounting holes 62 and be threaded into internally threaded upper screw mounting holes 56 to couple the cover 60 to the support bracket 34. The cover 60 also has two bottom screw mounting holes 66 alignable with the lower screw mounting holes 41 so that two bottom mounting screws 68 may pass through the bottom screw mounting holes 66 and be threaded into internally threaded lower screw mounting holes 41.

The latch release 14 also includes a pivotally reciprocating actuator cam 72 pivotally coupled to the floor 35 of the support bracket 34 at opening 40. The actuator cam 72 is coupled to the end of shaft 16 through the shaft receiver and shaft hole 73 on the actuator cam 72 so that pivotal rotation of the shaft 16 causes pivotal movement of the actuator cam 72 relative to the floor 35. The actuator cam 72 has an arcuate guide slot 74 that receives the cam guide pin 42 to limit the pivotal movement of the actuator cam 72. The actuator cam 72 has an exterior, outermost, or outboard camming surface 76 that includes a generally flat dwell portion 78 and an arcuate or round camming surface portion 80. The actuator cam 72 pivots or rotates between a first, initial or latching position, shown in FIGS. 2 and 6, and a second, engaged, or unlatching position, shown in FIGS. 3, 5 and 8.

The latch release 14 also includes a pivotally reciprocating L-shaped turnbuckle or L-shaped actuator 84 coupled to the floor 35 of the support bracket 34 through a first pivot rod or pin 86 extending through the actuator 84 and into the two oppositely disposed actuator pivot pin mounting holes 44 in the sidewalls 36 and 37. The actuator 84 has a first, cam following portion 88 extending to a hollow cylindrical portion 90 that accepts the first pivot rod 86. The actuator 84 also has a second, pushing portion 92 extending from the cylindrical portion 90 approximately perpendicularly to the first, cam following portion 88. The first cam following portion 88 has a generally flat cam follower bearing surface 94 that contacts the camming surface 76 of the actuating cam 72. The actuator 84 pivots between a first, initial or latching position, shown in FIGS. 2 and 6, an a second, engaged, or unlatching position, shown in FIGS. 3, 5, and 8.

The latch release 14 also includes a pivotally reciprocating L-shaped catch 98 coupled to the floor 35 of the support bracket 34 through a second pivot rod or pin 100 extending through the catch 98 and into the tongue pivot pin mounting holes 50 in the sidewalls 36 and 37. The catch 98 has a first, tongue portion 102 and a second, push plate portion 104 oriented generally perpendicularly to the tongue portion 102. The catch 98 pivots between a first, initial or latching position, shown in FIGS. 2 and 6, an a second, engaged, or unlatching position, shown in FIGS. 3, 4, 5, 7, and 8. The pushing portion 92 of the actuator 84 is configured to contact and push against the push plate portion 104 of the L-shaped catch 98 so as to pivotally move the L-shaped catch 98 from its latching position to its unlatching position. The L-shaped catch 98 also includes a coil spring 106 that biases the L-shaped catch 98 from its unlatching position back to its latching position to return or bias the L-shaped actuator 84 to its latching position.

The push bar 32 includes a first handle mount 108, a second handle mount 110, and an elongated push bar 112 coupled to and extending between the first handle mount 108 and second handle mount 110. The ends of the push bar 112 are positioned within handle openings 114 within the handle mounts 108 and 110. A set screw is threaded to engage and fix the position of the push bar 112 relative to the bar mounts 108 and 110. A cap 116 is fitted to the handle openings 114 to seal the openings and interior of the push bar.

First handle mount 108 is pivotally coupled to the first bar mount 30 through a third pivot pin 120 which extends through the bottom pivot pin mounting hole 48 of the bottom lug 46. The bottom pivot pin mounting hole 48 may be fitted with a bushing 122 therein to provide easier movement between the third pivot pin 120 and the first handle mount 108. A spring 124 is coupled to the first handle mount 108 and first bar mount 30 so as to bias the first handle mount 108 towards its outwardly extending, unengaged or latched position.

The first handle mount 108 includes a top flange, or tang 128 positioned to reside between the push plate portion 104 of the L-shaped catch 98 and the support bracket 34 for pivotal engagement with the push plate portion 104. The first handle mount 108 also includes a stop flange 130 configured to engage or contact a stop or stop wall 132 extending from floor 35 of the support bracket 34. The first handle mount 108, and thus the push bar 32, is pivotal between a push bar latched position shown in FIGS. 2 and 6 and a push bar unlatched position shown in FIGS. 3, 4, and 7.

The second bar mount 31 is essentially of the same construction as the first bar mount 30 except for the inclusion of the actuating cam 72, L-shaped actuator 84, L-shaped catch 98 and their related components. The second bar mount 31 does not include or cooperate with the exterior latch 12 and is mainly present to support and aid in mounting the push bar 32 to the door D.

In use, the exterior pull type handle exterior latch 14 is mounted to the exterior surface of a door and the inside latch release 14 is mounted to the interior surface of the door D. The shaft 16 of the exterior latch 14 extends through the door D and is coupled to the shaft receiver 73 of the actuator cam of latch receiver 10, thereby actuatingly or operably coupling the exterior latch 14 to the interior latch release 14.

To open the door D from the exterior of the cold room a person need only grasp the pivotal handle H of the exterior latch 12 and rotate it and then pulling it towards themselves in a direction away from the door D. The actuation of the pivotal handle H pivotally moves the actuator cam 72, thereby moving the camming surface 76 so that the dwell portion 78 is removed from the latching position contacting the cam following portion 88 of the L-shaped actuator 84, as shown in FIGS. 2 and 6, and the round camming surface portion 80 now engages the cam following portion 88, as shown in FIGS. 3, 5, and 8.

Figure 2:
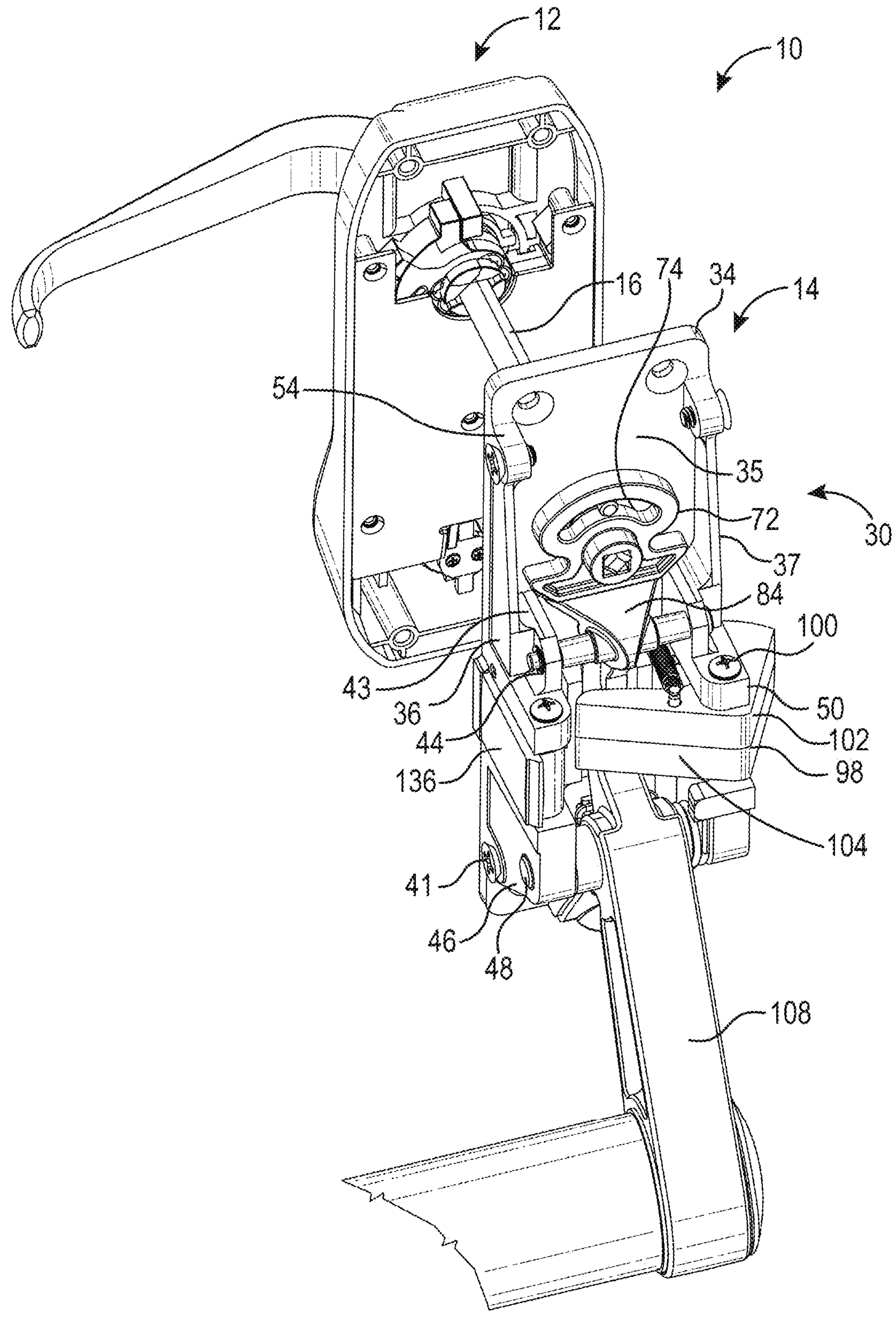
FIG. 2 is a perspective view of a portion of the push bar latch release assembly of FIG. 1, shown in a latched position.
Figure 3:
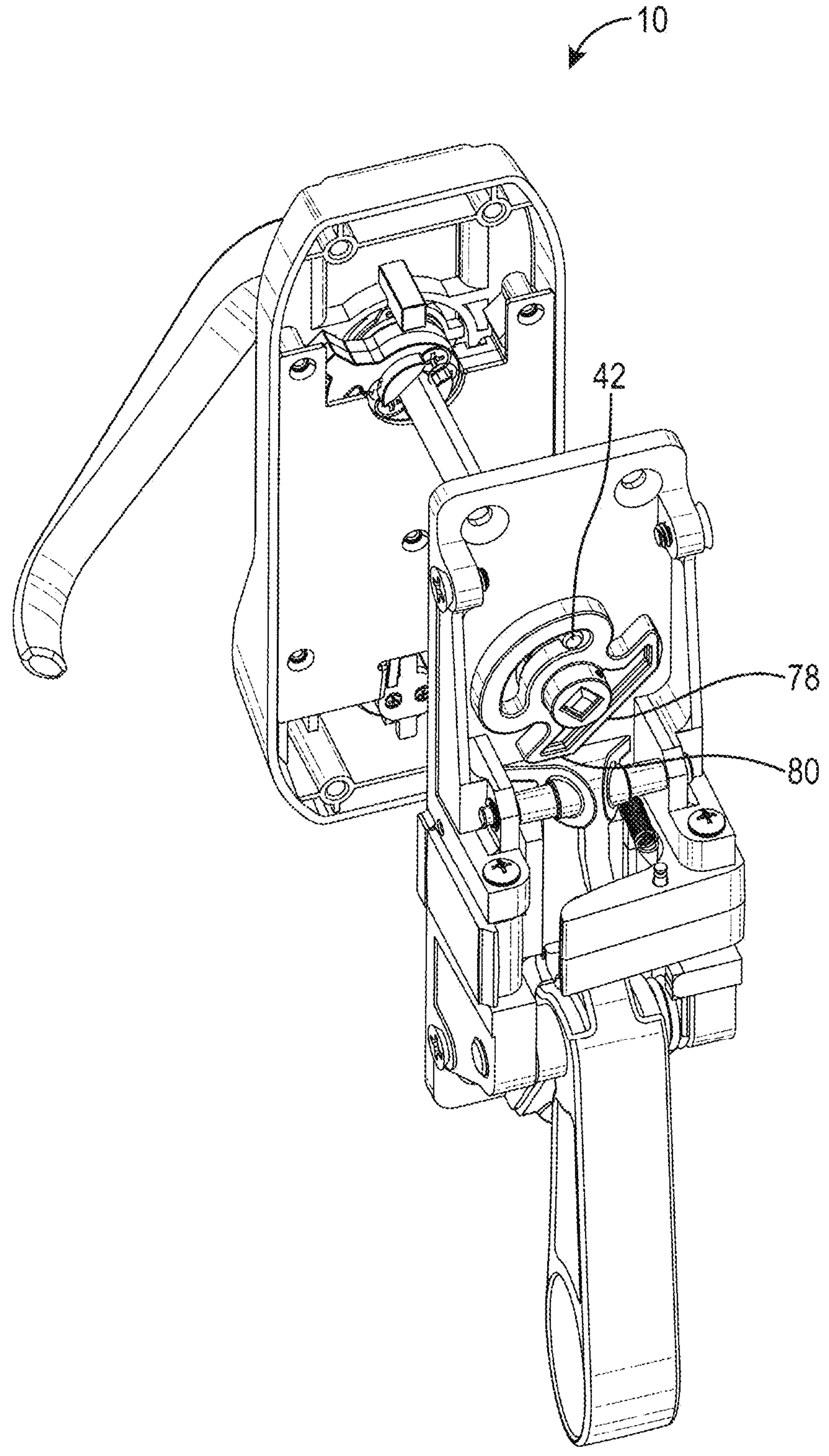
FIG. 3 is a perspective view of a portion of the push bar latch release assembly of FIG. 1, shown in an unlatched position.
Figure 4:
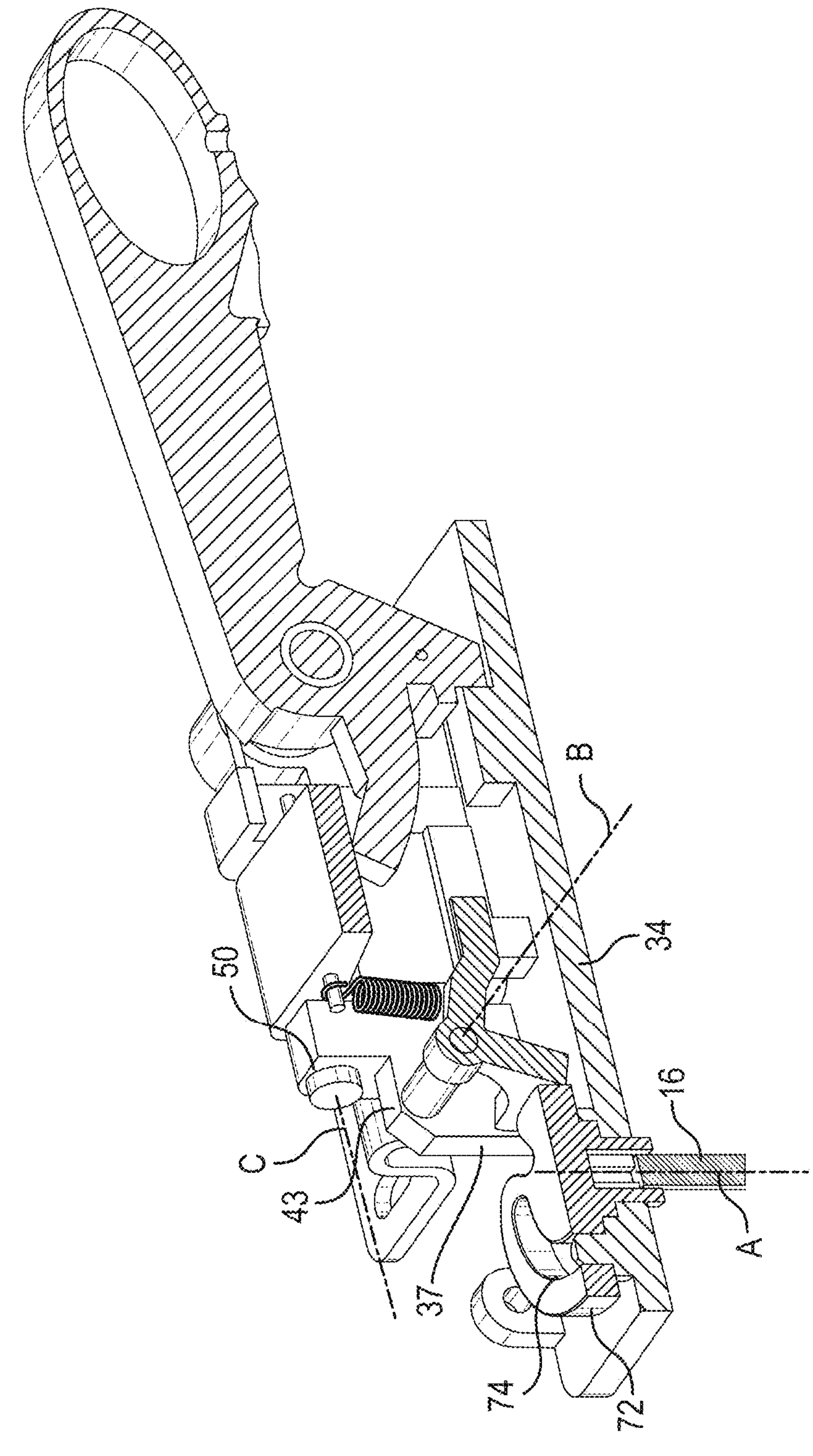
FIG. 4 is a perspective view of a portion of the push bar latch release assembly of FIG. 1, shown in a latched position.
Figure 5:
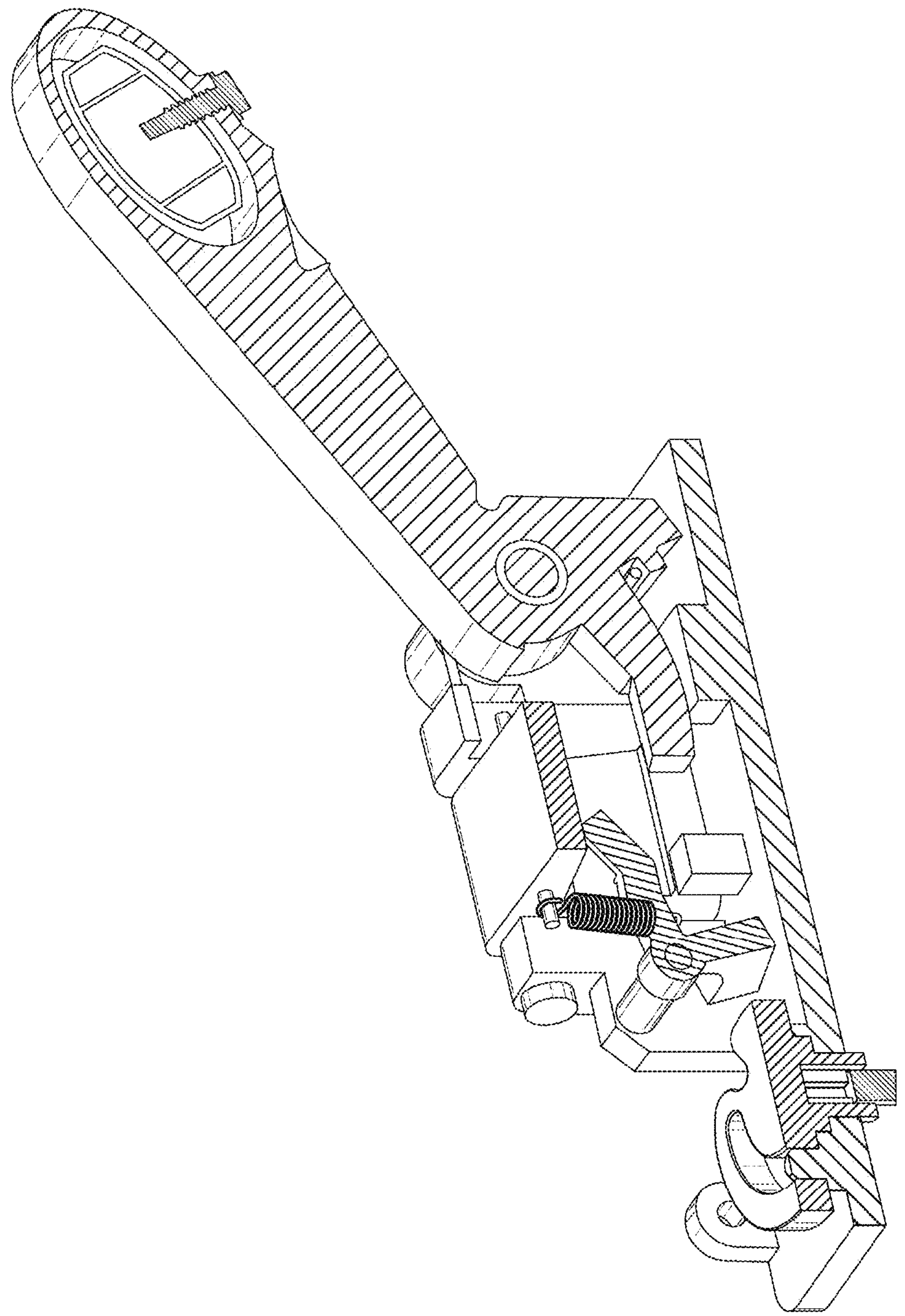
FIG. 5 is a perspective view of a portion of the push bar latch release assembly of FIG. 1, shown in an unlatched position.
Figure 6:
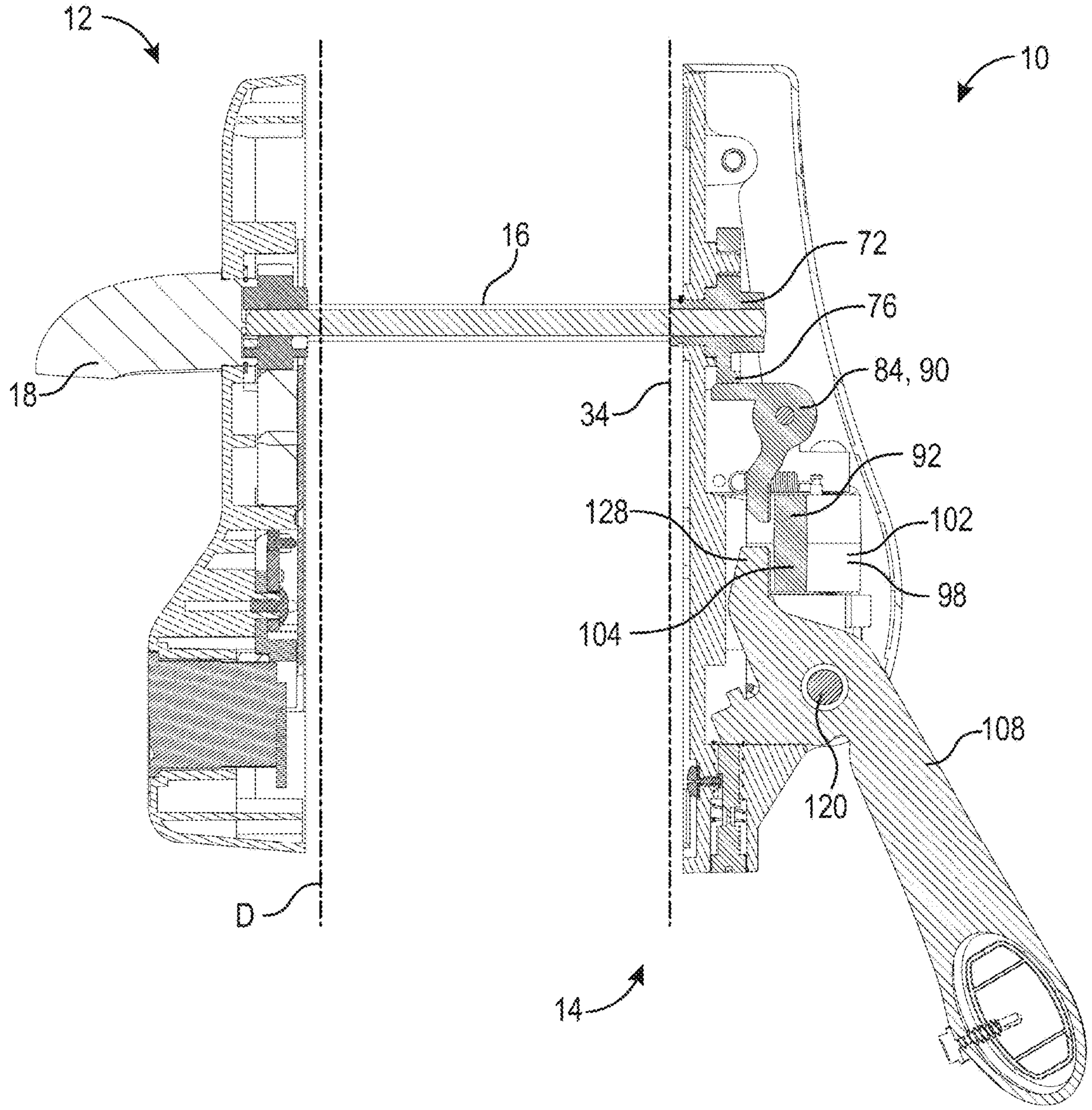

The continued rotation of the handle 18 causes further pivotal rotation of the actuator cam 72 so that the round camming surface portion 80 further pushes the cam following portion 88 so as the cause the L-shaped actuator 84 to pivot about first pivot pin 86 from its latched position, shown in FIGS. 2 and 6, to its unlatched position, shown in FIGS. 3, 5, and 8. This pivotal movement causes the pushing portion 92 of the actuator 84 to pivot towards and push against the push plate portion 104 of the L-shaped catch 98. The pushing upon the push plate portion 104 causes pivotal movement of the L-shaped catch 98 about the second pivot pin 100 and against the biasing force of spring 106. Thus. the L-shaped catch 98 is pivoted from its latched position, shown in FIGS. 2 and 6, to its unlatched position, shown in FIGS. 3, 5, and 8, wherein the tongue portion 102 is disengaged from the strike S of the door jamb which allows the door D to be pivoted to an open position.

To open the door D from the interior of the cold room a person may push anywhere on the elongated push bar 32, thereby pivoting the handle mounts 108 and 110 towards the door and to their unlatched position. The pivoting of the first handle mount 108 about third pivot pin 120 causes its top tang 128 to move against the bottom surface of the push plate portion 104 thereby pivoting the L-shaped catch 98 from its latched position, shown in FIGS. 2 and 6, to its unlatched position, shown in FIGS. 4 and 7. Again, this pivoting of the L-shaped catch 98 results in the tongue portion 102 being disengaged from the strike of the door jamb allowing for the opening of the door D.

Once the latch release 14 is released by the person or operator, the coil springs 124 forces the handle mounts 108 and 110 to pivot about third pivot pins 120 back to their initial, extended latched positions.

The interior latch release 14 is separate and apart from the exterior latch 12. Therefore, if the exterior latch 12 is in need of replacement, it can be replaced without the need of also replacing the interior latch release 14, or visa-versa.

It should be understood that the latch release 14 may be configured to that the L-shaped catch 98 may be coupled to either the left side wall 36 or the right side wall 37 through a simple mounting of the first pivot pin to either side wall. Thus, a spacer plate 136 is shown mounted to the left side wall 36 in FIGS. 2, 3, and 9, while two L-shaped catches 98 are shown on opposite sides in FIG. 1 merely to show the two possible positions of the L-shaped catches 98.

The exterior latch 12 may be fitted with a lock to prevent the pivotal movement of the exterior latch 12 to maintain the door in a latched position.

It should be understood that the actuator cam is pivotal about an axis A. The actuator 84 is pivotal about an axis B that is longitudinally aligned along the first pivot pin 86 so that axis A is oriented perpendicular to axis B. The second pivot pin 100 of the L-shaped catch 98 allows for pivotal movement of the L-shaped catch 98 about an axis C that is longitudinally aligned along the second pivot pin 100. Axis C is oriented perpendicular to axis A and oriented perpendicular to axis B.

It should be understood that the foregoing descriptions merely relate to exemplary, illustrative embodiments of the invention. Therefore, it should also be understood that various modifications may be made to exemplary embodiments described herein that are within the scope of the invention, which will be recognized by one of ordinary skill in the art in light of the disclosure herein. Furthermore, various elements of the described exemplary embodiments of the invention may be known in the art or recognized by one of ordinary skill in the art based on the disclosure herein.

The invention claimed is:

1. A push bar latch release assembly couplable to a door for engagement with a door strike on a door frame associated with the door, said push bar latch release assembly comprising:

an exterior handle latch having a pivotal handle and a pivotal shaft coupled to said pivotal handle, and an interior latch release coupled to said exterior handle latch, wherein said interior latch release comprising:

a first bar mount;

a second bar mount, and an elongated push bar coupled to said first bar mount and said second bar mount for movement between a push bar latched position and a push bar unlatched position;

said first bar mount comprising:

a support bracket mounted to the door;

a reciprocally pivotable actuator cam coupled to said shaft of said exterior handle, said actuator cam having a camming surface, said actuator cam being pivotal between a cam latched position and a cam unlatched position;

a reciprocally pivotable actuator having a cam following portion in camming contact with said camming surface of said actuator cam, and a pushing portion oriented at an angle to said cam following portion, said actuator being pivotal between an actuator latched position when said actuator cam is in its cam latched position and an actuator unlatched position when said actuator cam is in its cam unlatched position;

a L-shaped catch having a push plate portion in contacting engagement with said pushing portion of said actuator, and a tongue portion oriented at an angle to said push plate portion engageable with the door strike of the door frame, said L-shaped catch being pivotal between a catch latched position engaging the door strike when said actuator is in its actuator latched position and a catch unlatched position unengaged with the door strike when said actuator is in its actuator unlatched position, said L-shaped catch also being pivotal between the catch latched position engaging the door strike when said push bar is in its push bar latched position and the catch unlatched position unengaged with the door strike when said push bar is in its push bar unlatched position, and a cover coupled to said support bracket and covering said actuator cam, said actuator, and said L-shaped catch.

2. The push bar latch release assembly of claim 1 wherein said actuator cam has a dwell portion and an arcuate camming surface portion, wherein said cam following portion of said actuator contacts said dwell portion when said cam following portion is in its actuator latched position, and wherein said cam following portion of said actuator contacts said cam arcuate camming surface portion when said cam following portion is in its actuator unlatched position.

3. The push bar latch release assembly of claim 1 wherein said push bar includes a handle mount with a top flange, and wherein said top flange engages said push plate portion of said L-shaped catch to move said push plate portion from the catch latched position to the catch unlatched position.

4. The push bar latch release assembly of claim 3 wherein said handle mount of said push bar also includes a stop flange, and wherein said support bracket includes a stop wall configured to abut said stop flange when said push bar is in its push bar latched position.

5. The push bar latch release assembly of claim 1 wherein said actuator includes a first pivot pin for pivotal movement of said actuator between the actuator latched position and the actuator unlatched position.

6. The push bar latch release assembly of claim 5 wherein said actuator cam is pivotal about a first axis, and wherein said actuator is pivotal about a second axis longitudinally aligned along said first pivot pin and oriented perpendicular to said first axis.

7. The push bar latch release assembly of claim 6 wherein said L-shaped catch includes a second pivot pin for pivotal movement of said L-shaped catch between the L-shaped catch latched position and the L-shaped catch unlatched position, said second pivot pin being pivotal about a third axis longitudinally aligned along said second pivot pin, said third axis being oriented perpendicular to said first axis and being oriented perpendicular to said second axis.

8. A push bar latch release couplable to a door for engagement with a door strike on a door frame associated with the door and coupled to an exterior handle latch having a pivotal handle and shaft coupled to the handle, said push bar latch release comprising:

a first bar mount;

a push bar coupled to said first bar mount for movement between a push bar latched position and a push bar unlatched position, said push bar including a handle mount coupled to said first bar mount;

said first bar mount comprising:

a support bracket mountable to the door;

a pivotable actuator cam coupled to the shaft of the exterior handle, said actuator cam having a camming surface;

a pivotable actuator having a cam following portion in contact with said camming surface of said actuator cam, said pivotable actuator also having a pushing portion coupled to said cam following portion;

a L-shaped catch having a push plate portion in contacting engagement with said pushing portion of said actuator, and a tongue portion coupled to said push plate portion that is engageable with the door strike of the door frame, a cover coupled to said support bracket and covering said actuator cam, said actuator, and said L-shaped catch, whereby pivotal movement of the handle shaft causes the actuator cam to pivot resulting in the camming surface riding upon the cam following portion so as to pivot the pivotable actuator to cause the pivotal movement of the L-shaped catch to disengage the tongue portion from the strike of the door jamb.

9. The push bar latch release of claim 8 wherein said actuator cam has a dwell portion and an arcuate camming surface portion, wherein said cam following portion of said actuator contacts said dwell portion when said cam following portion is in an actuator latched position, and wherein said cam following portion of said actuator contacts said cam arcuate camming surface portion when said cam following portion is in an actuator unlatched position.

10. The push bar latch release of claim 8 wherein said push bar includes a handle mount with a top flange, and wherein said top flange engages said push plate portion of said L-shaped catch to pivot said L-shaped catch.

11. The push bar latch release of claim 10 wherein said handle mount of said push bar also includes a stop flange, and wherein said support bracket includes a stop wall configured to abut said stop flange when said push bar is in a stop bar latched position.

12. The push bar latch release of claim 8 wherein said actuator includes a first pivot pin for pivotal movement of said actuator between an actuator latched position and an actuator unlatched position.

13. The push bar latch release of claim 12 wherein said actuator cam is pivotal about a first axis, and wherein said actuator is pivotal about a second axis longitudinally aligned along said first pivot pin and oriented perpendicular to said first axis.

14. The push bar latch release of claim 13 wherein said L-shaped catch includes a second pivot pin for pivotal movement of said L-shaped catch between an L-shaped catch latched position and an L-shaped catch unlatched position, said second pivot pin being pivotal about a third axis longitudinally aligned along said second pivot pin, said third axis being oriented perpendicular to said first axis and being oriented perpendicular to said second axis.

* * * * *